United States Patent [19]

Touji et al.

[11] Patent Number: 5,006,586

[45] Date of Patent: Apr. 9, 1991

[54] HEAT RESERVE MATERIAL

[75] Inventors: Daijiro Touji, Kakogawa; Akihiro Nakahara, Ibaragi; Takefumi Nakashita, Kobe; Atsuko Mitsuba, Kobe; Yukiyasu Nakashio, Kobe; Tsuneyuki Nagase, Takatsuki, all of Japan

[73] Assignee: Sumitomo Rubber Industries, Limited, Hyogo, Japan

[21] Appl. No.: 337,750

[22] Filed: Apr. 13, 1989

[30] Foreign Application Priority Data

Apr. 15, 1988 [JP] Japan .................................. 63-94239

[51] Int. Cl.$^5$ ............................ C08K 5/04; C08K 5/55
[52] U.S. Cl. ..................................... 524/377; 524/388; 524/389; 524/405; 524/557; 524/558; 524/417; 524/379
[58] Field of Search ............... 524/557, 377, 388, 389, 524/405, 558

[56] References Cited

U.S. PATENT DOCUMENTS 4,629,751 12/1986 Montgomery ...................... 523/219
4,798,758 1/1989 Wagano et al. ...................... 428/213

FOREIGN PATENT DOCUMENTS 18622 12/1962 Japan .

*Primary Examiner*—Joseph L. Schofer
*Assistant Examiner*—John J. Guarriello
*Attorney, Agent, or Firm*—Birch, Stewart, Kolasch & Birch

[57]    ABSTRACT

A heat reserve material having excellent physical properties. The heat reserve material comprises;
(A) a hydrophilic polymer having a hydroxyl group on a principal chain,
(B) oxide glass, and
(C) water and/or a water-soluble alcohol, wherein an amount of component (B) is within the range of 1 to 50 parts by weight based on 100 parts by weight of component (A), and an amount of component (C) is 6 to 50 times larger than the total weight of components (A) and (B).

4 Claims, No Drawings

HEAT RESERVE MATERIAL

FIELD OF THE INVENTION

The present invention relates to a novel heat reserve material having excellent physical properties.

BACKGROUND OF THE INVENTION

A composition which comprises water-impregnated polyvinyl alcohol is generally used as a low temperature reserve material, because it is a gel having a suitable viscosity and fluidity and a low heat transfer rate. The composition, however, is difficult to treat due being characterized with adhesive properties. It also has poor shape retention and flows in the manner of a liquid.

SUMMARY OF THE INVENTION

The present invention provides a heat reserve material having excellent physical properties. The heat reserve material comprises;
(A) a hydrophilic polymer having a hydroxyl group on a principal chain,
(B) oxide glass, and
(C) water and/or a water-soluble alcohol,
wherein the amount of component (B) is within the range of 1 to 50 parts by weight based on 100 parts by weight of component (A), and the amount of component (C) is 6 to 50 times larger than the total weight of components (A) and (B).

DETAILED DESCRIPTION OF THE INVENTION

Component (A) is a hydrophilic polymer having a hydroxyl group on a principal chain. By "hydrophilic" herein is meant either water-soluble or water-miscible. The hydrophilic polymer includes polyvinyl alcohols prepared by completely or partially saponifying polyvinyl acetate or copolymers of vinyl acetate with other vinyl monomers (such as, ethylene, vinyl chloride, (meth)acrylic acid, alkyl (meth)acrylates, maleic anhydride, alkyl vinyl ether and the like); modified or grafted polyvinyl alcohols; polymers or copolymers of hydroxyl group-containing polymerizable monomers (such as, 2-hydroxyethyl (meth)acrylate); and the like. Among the more preferred are polyvinyl alcohols, because they are available in industrial scale at a low cost. The polyvinyl alcohols preferably have a saponification degree of at least 80%, preferably at least 85%. If a saponification degree is less than 80%, an impact resilience of the composition is poor.

The oxide glass employed in the present invention typically includes borate glass, silicate glass, phosphate glass, a mixture thereof and the like. Although the present invention is not limited to a particular theory, it is believed that the oxide glass is reacted with hydrophilic polymer (A) in the presence of water and/or water-soluble alcohols. In the oxide glass, a network structure is generally formed through the oxygen. Polymer (A) is bonded to the oxygen to partially form a three-dimentional dimentional structure. In view of reactivity with polymer (A), borate glass or a mixture of borate glass and the other glass is preferred. Borate glass is primarily formed from $B_2O_3$, but may contain other components, such as $Al_2O_3$, $K_2O$, $Na_2O$, CaO, MgO and the like.

The oxide glass can be employed in the form of a powder which is generally prepared by melting glass and then grinding. A particle size of the glass is not limited, but preferably within the range of 10 to 250 micrometer, preferably 5 to 150 micrometer.

The heat reserve material of the present invention contains water and/or a water-soluble alcohol. Examples of the water-soluble alcohols are monoalcohols, such as methanol, ethanol, propanol, isopropanol, butanol and t-butanol; polyhydric alcohols, such as propanediol, glycerol, ethylene glycol, diethylene glycol, triethylene glycol, polyethylene glycol, propylene glycol and trimethylolpropane. Water is most preferred because of the low cost and easy control of the temperature.

An amount of oxide glass (B) is within the range of 1 to 50 parts by weight, preferably 5 to 30 parts by weight based on 100 parts by weight of polymer (A). Amounts of less than 1 part by weight result in a decline in shape retention. If oxide glass (B) is more than 50 parts by weight, it does not participate in the crosslinked matrix and is separated from the matrix.

An amount of the component (C) is present in the heat reserve material of the present invention in amount of 600 to 5,000 parts by weight, preferably 1,000 to 3,000 parts by weight based on 100 parts by weight of the total amount (A) and (B). If component (C) is more than 5,000 parts by weight, the fluidity of the obtained material is too high. The physical properties of the heat reserve material of the present invention are varied widely by the amount of component (C) present.

Above components (A), (B) and (C) are simply mixed to form the material of the present invention. The mixing is generally carried out at an elevated temperature, generally from 60° to 100° C. for 20 minutes to 2 hours, more preferably from 80° to 90° C. for 30 minutes to one hour. It is believed that the reaction mentioned above occurs during the mixing.

The heat reserve material of the present invention may contain additives in addition to the above three components. Examples of the additives are a dye stuff, a pigment or an inorganic or organic filler.

According to the present invention, component (C), i.e. water or an alcohol, is entrapped in the matrix which is formed by polymer (A) and oxide glass (B). As is mentioned above, the matrix is three-dimentionally crosslinked and therefore it can better prevent flowablity and have better shape retention than a conventional gel which consists of polyvinyl alcohol and water. Since the material of the present invention contains water much more water than a conventional gel, more thermal energy is stored, and also, the heat transfer rate is. The material is quite suitable for low or high temperature insulation. The material also shows a little resilience and therefore is suitable as a cushioning material, a stress relaxing material and the like. It is further suitable as a water pillow, a water bed, a bedsore-preventive mattress and the like, because its temperature is constantly lower than one's body temperature.

EXAMPLES

The present invention is illustrated by the following Examples, which are not to be construed as limiting the present invention to their details.

EXAMPLE 1

Sixty grams of polyvinyl alcohol having a saponification degree of 99% and a polymerization degree of 2,000 was mixed with 6 g of borate glass ($B_2O_3$ 60% by weight, $Al_2O_3$ 25% by weight, $Na_2O$ 15% by weight), to which 1,500 g of water was added and mixed to form a gelled composition. The composition has a little resilience and can be used as a shock absorbing material.

One Kg of the obtained composition charged in a 200×300 mm plastic bag to form a heat reserve material and heated in water of 80° C. for 30 minutes. It was then allowed to stand for 25 minutes and a time in which a surface temperature reduced to 40° C. (hereinafter referred as heat retention time (H+L)) was measured.

The result is shown in Table 1.

Then, the heat reserve material was cooled to 20° C. and allowed to stand in a room at 30° C. and RH of 60 %. A time in which a surface temperature increased to 30° C. (hereinafter referred as heat retention time (L+H)) was measured. The result is shown in Table 1.

The heat reserve material was put on the shoulder. Shape retention was evaluated whether the gel on the shoulder would flow downward. The result is shown in Table 1.

O; The gel did not flow downwards.
Δ; The gel did flow a little downwards.
x; The gel did flow downward almost completely.

A hardness ($C_2$) of the material was also determined by an Asker $C_2$ meter available from Kobunshi Keiki Co., Ltd and the result also is shown in Table 1.

EXAMPLES 2 TO 7 AND COMPARATIVE EXAMPLES 1 TO 4

With employing the ratio of the components (A), (B) and (C), the heat reserve materials of the present invention were prepared as generally described in Example 1 and subjected to the same test for physical properties. The result is shown in Table 1.

TABLE 1

|  | Examples | | | | | | | Comparative examples | | | |
|---|---|---|---|---|---|---|---|---|---|---|---|
|  | 1 | 2 | 3 | 4 | 5 | 6 | 7 | 1 | 2 | 3 | 4 |
| A/B Ratio | 100/10 | 100/10 | 100/20 | 100/20 | 100/20 | 100/40 | 100/5 | 100/0 | 100/60 | 100/20 | 100/20 |
| C/(A + B) Water | 20 |  | 10 | 20 | 40 | 20 | 20 | 20 | 20 | 3 | 60 |
| Methanol |  | 20 |  |  |  |  |  |  |  |  |  |
| Heat retention time (H →L) | 5.0 | 4.0 | 4.8 | 5.1 | 5.0 | 4.7 | 4.8 | 4.5 | — | 2.2 | 4.3 |
| Heat retention time (L →H) | 2.0 | 1.6 | 2.0 | 2.1 | 1.8 | 1.9 | 1.9 | 1.6 | — | 0.9 | 1.7 |
| Shape retention | O | O | O | O | O | O | O | X | — | O | O |
| Hardness ($C_2$) | 23 | 20 | 33 | 25 | 15 | 22 | 15 | 2 | — | 40 | 10 |

What is claimed is:

1. A heat reserve material consisting essentially of:
   (A) a hydrophilic polymer having a hydroxyl group on a principal chain,
   (B) borate glass, and
   (C) water and/or a water-soluble alcohol, wherein an amount of component (B) is within the range of 1 to 50 parts by weight based on 100 parts by weight of component (A), and an amount of component (C) is 6 to 50 times larger than the total weight of components (A) and (B).

2. The heat reserve material according to claim 1 wherein said component (A) is a polyvinyl alcohol.

3. The heat reserve material according to claim 2 wherein said polyvinyl alcohol has a saponification degree of at least 80%.

4. The heat reserve material according to claim 1 wherein component (C) is present in amount of 600 to 5,000 parts by weight based on 100 parts by weight of the total weight of components (A) and (B).

* * * * *